Patented Sept. 22, 1970

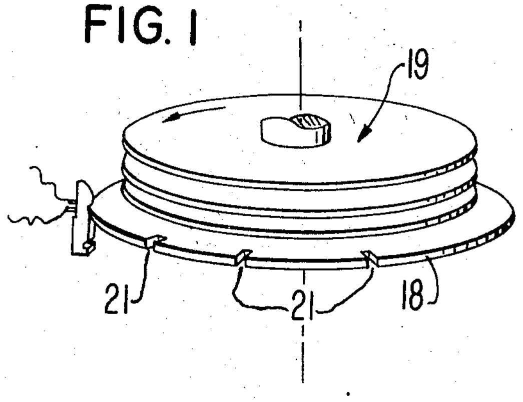
FIG. 2
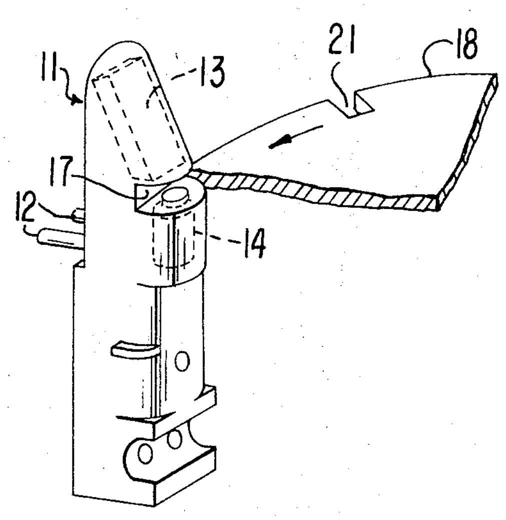
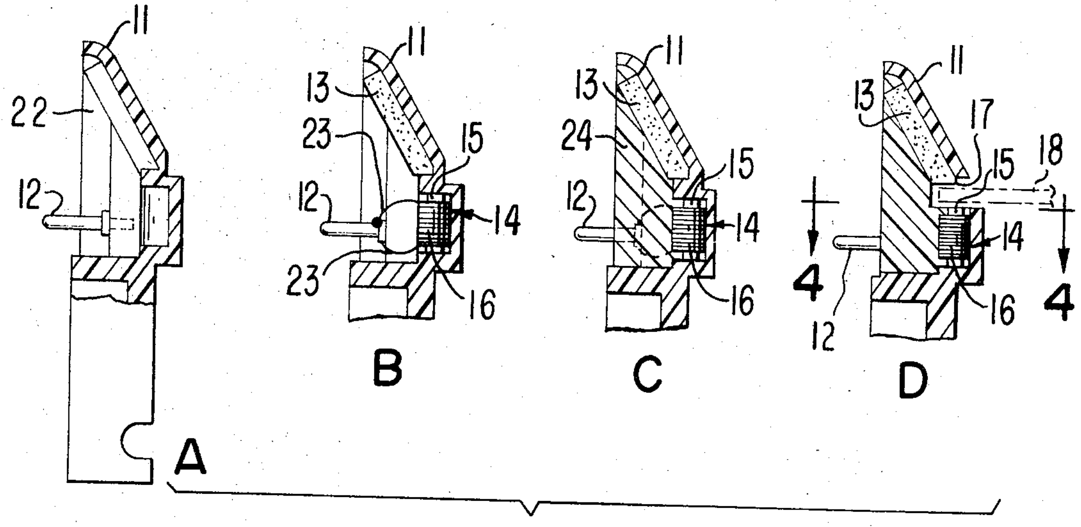
FIG. 3
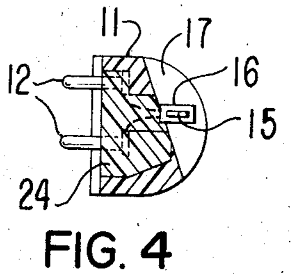
FIG. 4
INVENTOR.
ROY A. APPLEQUIST
BY Limbach & Limbach
ATTORNEYS United States Patent Office 3,530,323

3,530,323

ELECTROMAGNETIC TRANSDUCER APPARATUS USING DC MAGNET INPUT AND ELECTROMAGNETIC PICKUP COIL OUTPUT

Roy A. Applequist, San Jose, Calif., assignor to Peripheral Systems Corporation, Sunnyvale, Calif., a corporation of California Filed June 5, 1969, Ser. No. 830,627
Int. Cl. H02k *19/20*
U.S. Cl. 310—168 3 Claims

ABSTRACT OF THE DISCLOSURE

A transducer apparatus for use with the indexing discs of a disc pack is described. The input of the transducer is a DC magnet, preferably a permanent magnet, for creating a magnetic field. The output of the transducer is an electromagnetic pickup coil. The transducer input and output are positioned adjacent the rapidly rotating indexing disc of the disc pack. The rotating disc, in passing through the magnetic field of the input magnet, generates eddy currents in the surface thereof, these eddy currents being disturbed at those instances in time when a discontinuity, such as a slot in the disc, passes through the magnetic field. This discontinuity produces a change in the eddy currents.

The eddy currents induce a magnetic field which envelops the output pickup coil. A change in the eddy currents produced by the discontinuity in the indexing disc produces a changing flux through the pickup coil which in turn results in a pulse output from the pickup coil which serves as the indexing signal from the indexing disc.

The present invention relates in general to a novel transducer apparatus, and, more particularly, to a transducer apparatus operable for positional indexing of high velocity magnetic recording media such as rotary disc packs in magnetic disc storage units of data processing systems.

In prior art rotating disc pack file units, indexing has been accomplished in a number of ways. In one system the indexing was provided by a plurality of selectively positioned slots in the periphery of one of the rotating discs. A light source and photodetector apparatus was positioned so as to direct a beam of light from the light source through the slots and onto the photodetector such that the light impinged upon the photodetector during hat period of time when a slot passed the light, the light being cut off from the photodetector by the disc at all other times. A pulse of current was therefore generated from the photodetector for each slot encountered in the disc and these programmed pulses of current served as the indexing means for the rotating discs.

Certain problems have been encountered with the light detecting indexing apparatus, including a decreasing reliability over the life of the bulb as the light energy decayed, the indexing accuracy being affected both by bulb intensity shifts from voltage drifts and also from bulb aging. In addition, any undesired blocking of the beam path caused, for example, by the accumulation of dust or the momentary intrusion of a dirt particle produced a serious disruption in the indexing accuracy. The optical detector apparatus also suffers from the fact that these devices are not rugged and they also have a relatively low energy output.

Another form of transducer device utilized in cooperation with slots in the periphery of the rotating disc consisted of a pair of electromagnetic coils positioned on opposite sides of the disc and in coupled relationship such that an AC current applied to one of the coils, a primary coil, induced an AC current in the other coil, the secondary coil, during those periods of time when a slot was passing between the two coils. During those periods when the solid periphery of the disc passed between the primary and secondary coils, the magnetic flux to the secondary coil was substantially attenuated and the amplitude of the alternating output voltage from the secondary coil substantially reduced. The output from the secondary coil therefore consisted of an AC voltage of one particular amplitude during periods when the solid disc passed between the two coils and a substantially increased amplitude AC output during those periods where a slot in the disc passed between the primary and secondary coils.

This two coil AC induction system has the disadvantages in that it requires an AC oscillator power source to the input of the transducer and an AC detecting system at the output which is responsive to amplitude changes in the AC output signal. It has a relatively low energy output and the indexing accuracy is limited because of the oscillatory nature of the output and also because of input voltage drift.

A further system which has been suggested based upon the electromagnetic induction method and which eliminates the undesirable features of an oscillator input and an oscillating detector output consists of substituting a plurality of small magnets for the slots in the periphery of the rotating discs and utilizing a pickup coil for detecting the magnetic field of the magnets as they pass the detector coil. As each DC magnet passes the pickup coil, the moving magnetic field of the magnet induces a current in the pickup coil and results in a pulse at the output of the coil. This form of output signal is simple to detect relative to the optical system and the AC systems mentioned above. However, this is not a feasible system for use in rotating disc pack indexing since, among other things, it is very difficult to accurately mount a plurality of magnets within the confined space afforded by magnetic disc packs. In addition the weight of the magnets and the high velocity of the disc pack creates stability problems and the risk of magnets coming loose at high rotational speeds and flying off of the disc.

The present invention provides a novel transducer apparatus which utilizes the advantageous features of the electromagnetic induction method as opposed to the optical method while eliminating the need for the alternating current power input and the AC amplitude detection system employed in the previous electromagnetic transducer apparatus. The input of the transducer of the present invention comprises a small stationary permanent magnet and the output comprises a stationary pick up coil, the indexing method consisting of slots in the periphery of the rotating disc. The small permanent magnet is positioned so that the magnetic flux lines generated thereby are cut by the rapidly moving slotted disc and eddy currents are generated in the disc as a result of the rapid passage through the magnetic field. At any given speed of the disc, the eddy currents generated in the disc are constant and these constant eddy currents in the disc in turn generate magnetic field lines. The pickup coil is positioned so as to be immersed in this induced magnetic field. So long as the eddy currents are constant, the magnetic field produced thereby is constant and no currents are induced in the pickup coil by this constant magnetic field. When one of the slots in the periphery of the disc passes through the field of the DC magnet, the discontinuity in the disc causes a change in the eddy currents in the disc which in turn results in a change in the magnetic field induced by these eddy currents. This changing magnetic field induces a current in the pickup coil and thus generates a pulse output from the pickup coil. When the slot has passed through the magnetic field of the DC magnet, the eddy currents induced in the disc return to their normal steady state condtion, and the output signal from the pickup coil is terminated. In this manner, the successive slots in the rotating disc, as they pass the transducer of this invention, induce single pulses at the output of the transducer which serve as the indexing signals.

It will be noted that the signal in the pickup coil is not induced directly from the input of the transducer, in this case the DC magnet, but an eddy current is induced in the rotating disc from the DC magnet, the eddy current in turn serving to induce the signal in the output of the transducer.

There is no power input necessary to the transducer input as was the case of the optical transducer method and the AC electromagnetic induction method. Actually, the power for this system is obtained from the rotating disc since it is the rapid passage of the slots through the magnetic field which results in the production of eddy current changes in the disc which in turn result in energy being induced in the pickup coil.

These and other features and advantages of the present invention will become apparent from a perusal of the following specification taken in connection with the attached drawings wherein;

FIG. 1 is a plan view showing a section of a rotating disc pack, the bottom one of the discs having a plurality of indexing slots located therein for interacting with the novel transducer of the present invention, FIG. 2 is a perspective view of the novel transducer and a segment of the slotted disc passing through the transducer, FIGS. 3–A, B, C and D are cross-sectional view illustrating four stages in the manufacture of one form of the novel transducer of the present invention, and FIG. 4 is a cross-section of the transducer taken along section line 4—4 in FIG. 3–D.

The novel transducer and the manner in which it interacts with the rotating disc pack will be described with reference to FIGS. 1, 2, 3–D and 4 followed by a detailed description of one preferred method of manufacturing this novel transducer with reference to FIG. 3–A, B, C and D.

The main body 11 of the transducer is constructed of a strong but lightweight material such as molded plastic having a pair of connectors 12 extending from the rear of the body and fixedly embedded therein. These two connectors 12 serve as the two output terminals for the transducer. A small permanent bar magnet 13 is carried in the upper portion of the main body and a pickup coil 14 is carried in the body below and spaced apart from the lower end of the DC magnet. The pickup coil includes a solid metallic core 15 and a coil of wire 16 wound about the core, the two ends of the coil extending out for connection with the two output connectors 12. A recess or slot 17 is provided in the main body and between the lower end of the DC magnet and the upper end of the core 15 of the pickup coil 14, the recess being dimensioned so as to accommodate the outer edge or periphery of the lower aluminum disc 18 of the rotating disc pack 19. A plurality of indexing slots 21 are located in the disc pack, the slots being dimensioned relative to the size of the DC magnet 13 and pickup coil 14 so as to present a substantial discontinuity in the space between the magnet and coil as the slot passes through the transducer.

The operation of the transducer in conjunction with the rotating disc pack is as follows. In the inoperative state, i.e. with the disc standing stationary in the gap between the DC magnet 13 and pickup coil 14, the DC magnet or input of the transducer has no effect on and produces no output from the pickup coil output of the transducer. With the disc 18 rotating at the normal speed of rotation of such equipment, for example, 1500 revolutions per minute, the disc 18 passes under the end of the DC magnet 13 and thus passes through the magnetic field of the magnet. In cutting through this magnetic field at such a high speed, eddy currents are induced in the surface of the rotating aluminum disc and, provided the speed of the disc is substantially constant, the induced eddy currents will have a constant amplitude. These eddy currents in the disc 18 will in turn produce a magnetic field which extends through the core 15 of the pickup coil 14 located directly below the edge of the disc. So long as the disc speed is constant and the eddy currents are constant, the magnetic field generated thereby will be constant or unchanging and no currents will be induced in the pickup coil 14. At the point in time, however, when a slot 21 is passing through the magnetic field of the DC magnet 13 a sudden change in the induced eddy currents will occur due to the discontinuity in the disc produced by the slot and this rapid change in eddy currents will result in a rapid change in the magnetic field produced thereby. This changing magnetic field will produce a changing flux in core 15 and a cutting of the windings 16 in the pickup coil by the flux of the magnetic field and will result in an induced signal in the coil and a resultant output from the output terminals 12. Passage of the slot 21 from the vicinity of the magnetic field of the magnet 13 will result in a return of the eddy currents in the disc 18 to a steady state or normal value causing the magnetic field produced thereby to also return to a steady state condition and terminate the current induced in the pickup coil 14. The pulse output from the pickup coil is thereby terminated. Thus each slot 21 in the periphery of the rotating disc 18 will result in a pulse output from the pickup coil.

This simple pulse output may be handled by a very simple form of pulse detector coupled to the two output terminals. No power input to the DC magnet 13 is required and the rotating disc 18 in effect serves to induce its own indexing signal outputs in the pickup coil output of this novel transducer. The effect that the slots have on the transducer will not be influenced by dust or dirt particles forming in the slots provided, of course, that the obstructions are not of such a nature so as to prevent the eddy current changes necessary to produce the changing flux lines through the pickup coil.

The amplitude of the eddy currents induced in the disc is dependent upon the speed of rotation of the disc through the magnetic field and thus the amplitude output of the detection coil is proportional to the speed of the disc. This output amplitude may be utilized as a rough measure of the rotational speed of the disc.

The permanent magnet utilized in the transducer may be replaced by a coil supplied with a DC current from an input power source to produce the desired intensity of DC magnetic field; however the permanent magnet is a preferred embodiment since the electronic noise which may occur in a DC coil will create magnetic noise which results in noise in the output circuit of undesired nature.

It should be noted that a successful utilization of the present novel transducer apparatus does not require that the DC magnet input and the pickup output be positioned on opposite sides of the slotted discs. Both the magnet and pickup coil may be on the same side of the disc since the eddy currents in the disc will induce magnetic fields on both sides of the disc. Magnetic field changes brought about by eddy current changes in the disc can be detected on either side of the disc and the positioning of the pickup coil will be dictated by structural conveniences. The sensitivity of this transducer apparatus is roughly proportional to the square of the distance that the magnet and pickup coil are positioned from the rotating disc. It is therefore strongly desired that the disc be in close proximity to the end of the permanent magnet and to the pickup coil; for this reason the structure where the magnet is closely spaced from one side of the disc and the pickup coil disc closely spaced from the disc on the other side is preferred to that structure where the magnet and pickup coil are positioned on the same side of the disc, since it is more difficult to maintain close tolerances in the latter situation.

In one preferred method of manufacturing the novel transducer of the present invention the support base 11 is first manufactured in a one-piece plastic mold with the two output terminals 12 imbedded therein. The DC magnet 13 and the pickup coil 14 including the core 15 are then fixedly secured within a recessed portion 22 in the main base as by cementing. The two ends 23 of the pickup coil 14 are then connected to the two output terminals 12 as by soldering. The recessed portion 22 of the transducer body is then filled with a suitable filler 24 such as epoxy so that the magnet 13 and pickup coil 14 are firmly embedded therein, the epoxy hardening to form a solitary unit composed of the plastic base 11, the magnet 13, the pickup coil 14 and the hardened epoxy 24. After the structure has hardened, the slot or recess 17 is milled in the face between the magnet 13 and the end of a pickup coil 19. This preforming and milling method provides a carefully dimensioned recess or slot and very accurate tolerances between the transducer and the rotating disc.

It will be obvious to those skilled in the art that the structure of the transducer may take many forms and that the form shown in the drawings is only one preferred structure.

What is claimed is:

1. A transducer for detecting the rotary position of a rapidly rotating disc on a rotating magnetic memory having one or more indexing slots in the periphery of one disc thereof comprising a body with a groove therein with the periphery of said disc received in said groove, a DC magnet rigidly mounted in said body on one side of said groove positioned so as to have its magnetic field transversed by the rotating disc and slots therein, an eddy current being induced in the disc by its movement through the magnetic field of the magnet, the slots producing changes in the induced eddy current, and a pickup coil rigidly mounted in said body on the opposite side of said groove positioned in the magnetic field produced by the eddy current in the disc, the pickup coil having currents induced therein due to changes in the magnetic field produced by changes in the eddy current in the disc.

2. A transducer as claimed in claim 1 wherein said DC magnet comprises a permanent bar magnet.

3. A transducer as claimed in claim 1 wherein said pickup coil comprises a magnetic core member and a coil of wire wound about said core.

References Cited

UNITED STATES PATENTS

| | | | |
|---|---|---|---|
| 2,807,003 | 9/1957 | Alrich. | |
| 3,161,803 | 12/1964 | Knittweis | 310—168 |
| 3,230,407 | 1/1966 | Marsh | 310—168 |

FOREIGN PATENTS

| | | |
|---|---|---|
| 909,929 | 11/1962 | Great Britain. |

OTHER REFERENCES

Journal of Sci. Instruments; vol 31; October 1954; pp. 357–360.

MILTON O. HIRSHFIELD, Primary Examiner

R. SKUDY, Assistant Examiner